July 14, 1931. G. A. BOESGER 1,814,616
PRESSURE OPERATED SAND BLAST VALVE
Filed Oct. 9, 1926

INVENTOR.
George A. Boesger
BY
Fay, Oberlin & Fay
ATTORNEYS.

Patented July 14, 1931

1,814,616

UNITED STATES PATENT OFFICE

GEORGE A. BOESGER, OF CLEVELAND, OHIO, ASSIGNOR TO THE W. W. SLY MANUFACTURING COMPANY, OF CLEVELAND, OHIO, A CORPORATION OF OHIO

PRESSURE OPERATED SAND BLAST VALVE

Application filed October 9, 1926. Serial No. 140,495.

The present invention relates to pressure operated valves and more particularly to a valve construction for use in the pressure tanks of sand blasting apparatus. In the present valve use is made of a ball as the valve proper, and this is so arranged as to receive the air under pressure not only to close the valve, but also so as to make the valve ball self-cleansing, and thus reduce the wear due to the abrasive action of the material which is fed through the valve. To the accomplishment of the foregoing and related ends, said invention, then consists of the means hereinafter fully described and particularly pointed out in the claims.

The annexed drawings, and the following description set forth in detail certain mechanism embodying the invention, such disclosed means constituting, however, but one of various mechanical forms in which the principle of the invention may be used.

Figure 1:
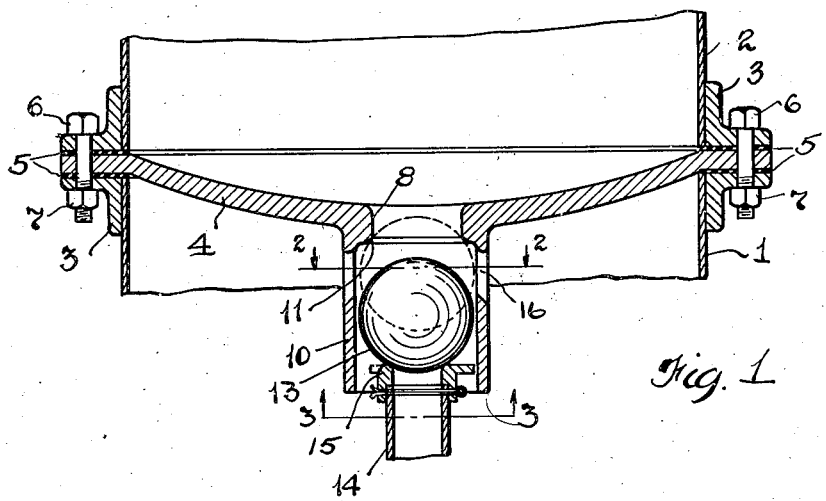
Figure 2:
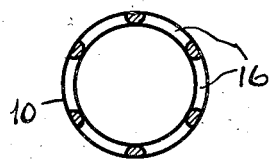
Figure 3:
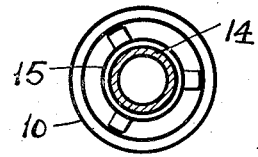

In said annexed drawings:

Fig. 1 is a central vertical section through a portion of a pressure tank showing the valve mechanism; Figs. 2 and 3 are sectional views on the lines 2—2 and 3—3 respectively of Fig. 1.

As illustrated, there is shown a portion 1 of a pressure tank together with a portion of a sand hopper or additional pressure chamber 2 thereabove, each of these tank portions being provided with a flange 3, and a partition wall 4 is shown as mounted between these flanges, such wall being provided with the usual packing 5 and being secured in position by means of the bolts 6 and nuts 7 as shown. The wall itself is preferably concave so as to aid in allowing the sand to flow to the central discharge opening 8. Below and around this opening, the partition wall is provided with a cylindrical, downwardly extending flange 10 which acts as the holding member for the valve ball 13. The valve seat 11 is formed at the lower edge of the opening through the partition wall and at this point the opening is tapered or rounded slightly so as to provide a curved or conical seat and the downwardly extending flange 10 is of greater internal diameter than the outside diameter of the seat so as to leave a space between the flange and the valve ball 13 which is mounted within the cylindrical flange. At the bottom of the flange is mounted the air pipe 14 and on the end of this pipe is carried a spider 15 on which the ball normally rests in the open position of the valve.

The cylindrical flange 10 is provided adjacent the partition wall with a series of apertures 16 so as to allow the sand coming through the partition opening to pass therethrough, being deflected by the curved upper surface of the ball and these openings also allow the incoming air, under pressure, to pass up through the cylindrical flange and around the sides of the ball and out through the openings and thus the incoming blast of air tends to keep the ball thoroughly cleaned from any abrasive which may have adhered thereto.

The valve ball itself is preferably formed of rubber and is solid or hollow as required so as to be both light enough to be easily movable under the action of the air pressure and heavy enough to close readily, and this type of valve tends to rotate whenever it is moved and thus continuously presents a different surface to the valve seat which reduces the wear which is normally very high in valves of this character where the material passing through the valve is an abrasive. The ball is also cleaned by the air blast and as the ball rotates in its travel up and down the cylindrical flange, it is kept thoroughly clean over its entire surface and thus the tendency for the valve to carry abrasive against the valve seat is reduced to a minimum.

The present valve is automatic in its action, being held in its closed position (shown in dotted lines) by the air pressure in the chamber below the flange when such chamber is open to the air pressure line, but whenever the pressure in the chamber is released, the valve ball will drop to the lower position (shown in full lines) and abrasive will then pass through the opening in the partition wall into the lower chamber and will continue to flow until such time as the chamber is filled or until air is again admitted through the air pipe to force the valve upwardly and raise the air pressure in the chamber.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a pressure operated sand blast valve, the combination of a wall having a valve opening and provided with a downwardly extending cylindrical flange surrounding said opening, and having a series of apertures adjacent the wall, an air pipe extending into said flange and forming therewith a valve cage and a valve ball mounted in said cage and adapted to be forced upwardly to close said opening.

2. In a pressure operated sand blast valve, the combination of a wall having a valve opening therethrough with the lower edge of such opening tapered outwardly to form the valve seat, said wall having a downwardly extending cylindrical flange surrounding said opening, said flange being provided with a series of apertures adjacent said wall and being of greater internal diameter than said valve seat, an air pipe extending into the lower end of said flange and forming therewith a valve cage, a valve ball mounted in said cage, said air pipe acting as a support for said ball when said valve is open.

3. In a pressure operated sand blast valve, the combination of a wall having a valve opening therethrough with the lower edge of such opening tapered outwardly to form the valve seat, said wall having a downwardly extending cylindrical flange surrounding said opening, said flange being provided with a series of apertures adjacent said wall and being of greater internal diameter than said valve seat, an air pipe extending into the lower end of said flange, a ball supporting spider mounted on the end of said air pipe and forming with said flange a valve cage, a valve ball mounted in said cage, said valve ball being adapted to close said air pipe in the open position of said valve.

4. A sand blast tank comprising a partition having an aperture therethrough, an integral cage depending from said partition, a check valve mounted in said cage, and adapted to close said aperture and a conduit extending into said cage and adapted to support said valve in its open position.

5. A sand blast tank comprising a partition having an aperture therethrough, an integral cage depending from said partition and surrounding said aperture, openings in the side wall of said cage, a ball check valve in said cage and an inlet conduit carrying a spider inserted in said cage and forming a support for said valve in its open position.

Signed by me this 7th day of October, 1926.

GEORGE A. BOESGER.